(12) United States Patent
Binzer et al.

(10) Patent No.: US 8,988,309 B2
(45) Date of Patent: Mar. 24, 2015

(54) RADAR SENSOR FOR MOTOR VEHICLES

(75) Inventors: Thomas Binzer, Ingersheim (DE);
Thomas Hansen, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 13/377,099

(22) PCT Filed: May 3, 2010

(86) PCT No.: PCT/EP2010/055967
§ 371 (c)(1),
(2), (4) Date: Jan. 17, 2012

(87) PCT Pub. No.: WO2011/000607
PCT Pub. Date: Jan. 6, 2011

(65) Prior Publication Data
US 2012/0146882 A1 Jun. 14, 2012

(30) Foreign Application Priority Data
Jul. 2, 2009 (DE) .......................... 10 2009 027 433

(51) Int. Cl.
*H01Q 15/02* (2006.01)
*H01Q 1/32* (2006.01)
*G01S 7/03* (2006.01)
*H01Q 19/06* (2006.01)

(52) U.S. Cl.
CPC .............. *H01Q 1/3233* (2013.01); *G01S 7/032* (2013.01); *H01Q 19/062* (2013.01)
USPC .................. 343/911 R; 343/753; 343/754

(58) Field of Classification Search
CPC ........ H01Q 3/46; H01Q 5/0079; H01Q 15/06
USPC ....................................... 343/911 R, 753, 754
See application file for complete search history.

(56) References Cited

U.S. PATENT DOCUMENTS

| | | | |
|---|---|---|---|
| 5,264,859 A | 11/1993 | Lee et al. | |
| 5,680,139 A * | 10/1997 | Huguenin et al. | 342/175 |
| 2007/0268198 A1* | 11/2007 | Marshall et al. | 343/911 R |
| 2008/0048921 A1* | 2/2008 | Rebeiz et al. | 343/754 |
| 2010/0265589 A1* | 10/2010 | Bowers et al. | 359/642 |

FOREIGN PATENT DOCUMENTS

| | | |
|---|---|---|
| DE | 10 2007 036 262 | 2/2009 |
| GB | 2 044 006 | 10/1980 |

\* cited by examiner

*Primary Examiner* — Dameon E Levi
*Assistant Examiner* — Collin Dawkins
(74) *Attorney, Agent, or Firm* — Kenyon & Kenyon LLP

(57) ABSTRACT

A radar sensor for motor vehicles, having a source of radar radiation and a lens, which is situated in front of the source, is made of a material that refracts radar radiation and has a convex surface on at least one side, wherein the convex surface has a greater curvature in elevation than in azimuth.

19 Claims, 3 Drawing Sheets

RADAR SENSOR FOR MOTOR VEHICLES

BACKGROUND INFORMATION

The present invention relates to a radar sensor for motor vehicles, having a source for radar radiation and a lens situated in front of the source and made of a material refractive for radar radiation, having a convex surface on at least one side.

BACKGROUND INFORMATION

Radar sensors are used in motor vehicles in conjunction with driver assistance systems, for example, distance warning systems and regulating systems, for location of objects, in particular other vehicles in the surroundings of the host vehicle. For example, long-range radar (LRR) sensors, which operate at a frequency of approximately 77 GHz as well as short-range radar sensors (SRR) at a frequency of 24 GHz are customary. If the radar sensor is installed in the vehicle and functions to measure the distance to preceding vehicles, the lens has the purpose of bundling the emitted and/or received radar radiation to form at least one radar lobe directed forward, so that the maximum intensity and sensitivity are achieved in the angle range in which preceding vehicles are normally located, whereas objects farther away from one's lane cause little or no radar echo. In the case of an angular resolution radar sensor, a plurality of radar lobes fanning out in azimuth is generated so that the azimuth angle of the object having been located may be deduced from amplitude and phase ratios between the signals obtained from the different lobes.

In the case of a customary design of radar sensors for motor vehicles, a spherical lens or, more generally, a lens in the form of a rotational body is used, this lens being made of a plastic having a high refractive index for the particular frequency of the radar radiation and bundling the radiation like a converging lens. Essentially the same directional characteristics are achieved in azimuth (in the horizontal) and in elevation (in the vertical). However, in the case of angular resolution radar sensors having a plurality of antenna elements situated side by side in the focal plane of the lens, a certain modification of the directional characteristic in azimuth may occur due to interference between these antenna elements.

Frequently, however, in particular in the case of long-range radar sensors, it would be desirable to bundle the radiation in elevation to a greater extent than in azimuth, so that on the one hand a sufficiently wide field of vision is achieved in azimuth, but on the other hand, due to stronger bundling in elevation, unnecessary power losses are avoided and at the same time interference signals due to reflection from the road surface (ground clutter) or the like are suppressed better. One possible method of achieving such an anisotropic directional characteristic, i.e., differing in elevation and in azimuth, is to use complicated lens systems having a plurality of lenses. In the case of radar sensors for motor vehicles, however, this is not practical for reasons of cost and because of the great amount of space required for the lens systems.

German Patent No. DE 10 2007 036 262 describes a radar sensor whose lens is composed of two plane-convex cylindrical lenses situated back to back, their cylinder axes running at right angles to one another and having different focal distances.

SUMMARY OF THE INVENTION

An object of the present invention is to create a radar sensor having a compact lens and an improved antenna characteristic in both elevation and azimuth.

This object is achieved by the fact that the convex surface has a greater curvature in elevation than in azimuth.

In the case of the radar sensor according to the present invention, the refraction behavior in azimuth and in elevation is determined by one and the same convex surface of the lens, so the lens may be designed as a plano-convex lens or as a concave/convex lens, which results in a compact design of the lens and thus of the entire radar sensor. The lens may be designed here in such a way that it has an aperture of approximately the same size in azimuth and in elevation, which contributes towards suppressing unwanted side lobes in the antenna diagram.

The lens preferably has a concave cylindrical lens structure on the side opposite the convex surface and thus facing the radiation source, its cylinder axis running vertically. Therefore the lens whose convex surface must have a relatively strong curvature on the whole in order for the required beam bundling to be achieved in elevation causes only a relatively weak bundling of the radar radiation in azimuth or none at all, so that a large angular range may be covered accordingly. The surface having a concave cylindrical curvature may have the shape of a circle in the horizontal section or may optionally also be in the form of an ellipse or a hyperbola.

The complex surface of the lens preferably is in the form of a conical section in both elevation and azimuth, having an elliptical shape, for example. In elevation, the lens is preferably designed as an aplanatic lens.

DETAILED DESCRIPTION OF THE INVENTION

Figure 1:
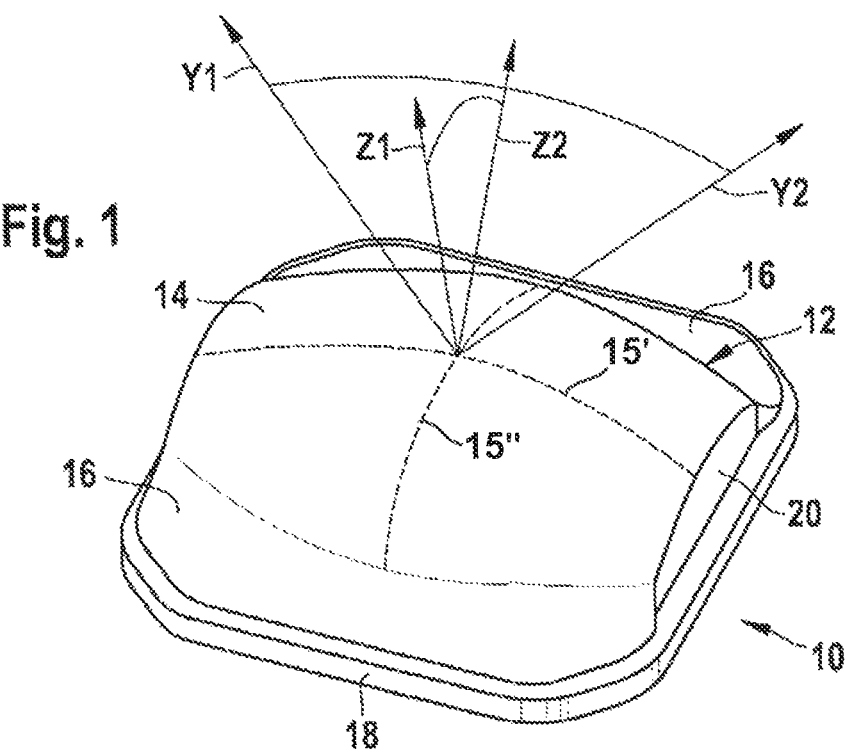
FIG. 1 shows a perspective diagram of a lens of a radar sensor in a view obliquely from the front.

FIG. 1 shows only a front cover cap 10 of a radar sensor, which is manufactured from a plastic refractive for microwaves by the injection molding method, for motor vehicles, for example, and in which a lens 12 is integrated. Cover cap 10 covers a housing (not shown), which holds the remaining components of the radar sensor, in particular an antenna array and the corresponding electronics, which form a source for transmitting radar radiation as well as a reception device for receiving the reflected radar signals. FIG. 1 is a view of the front side of lens 12 facing away from the source. On this front side the lens has a convex surface 14, which has different curvatures 15', 15" in different directions.

Arrows Y1 and Y2 in FIG. 1 symbolize an azimuthal plane, i.e., a plane running horizontally through the optical axis of lens 12. The curvature 15' of convex surface 14 is minimal in this plane. However, the curvature 15" of convex surface 14 is at its maximum in the elevation plane spanned by arrows Z1 and Z2 in FIG. 1. Accordingly, lens 12 has a smaller width in the vertical direction (in the direction of the elevation) than in the horizontal direction. The convex lens body therefore has an elongated shape and is connected at its longitudinal sides by socket surfaces 16 having a peripheral edge 18 of cover cap 10. However, the lens body is bluntly truncated at the height of edge 18 on its upper and lower ends (the left and right ends in FIG. 1) so that it is delimited by end faces 20 here.

Figure 2:
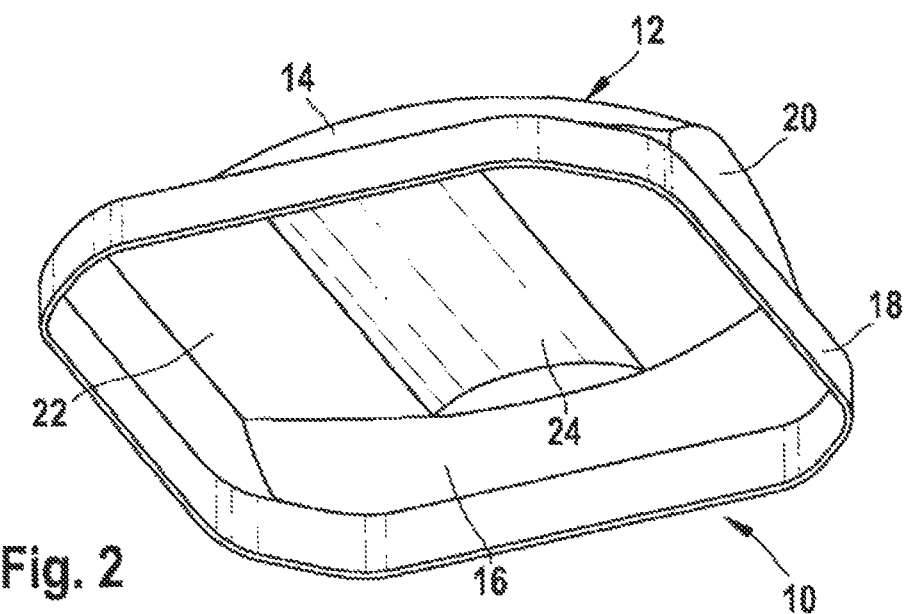
FIG. 2 shows a perspective diagram of a lens according to FIG. 1 in a view obliquely from the rear.

FIG. 2 shows a view of the internal side of cover cap 10. It is possible to see here that the body of lens 12, made of solid plastic, is delimited by a planar surface 22 on the internal side of the cover cap, i.e., the side facing the source, but this surface is interrupted by a concave cylindrical surface 24. The cylinder axis of cylindrical surface 24 runs vertically, i.e., in the direction of elevation.

Figure 3:
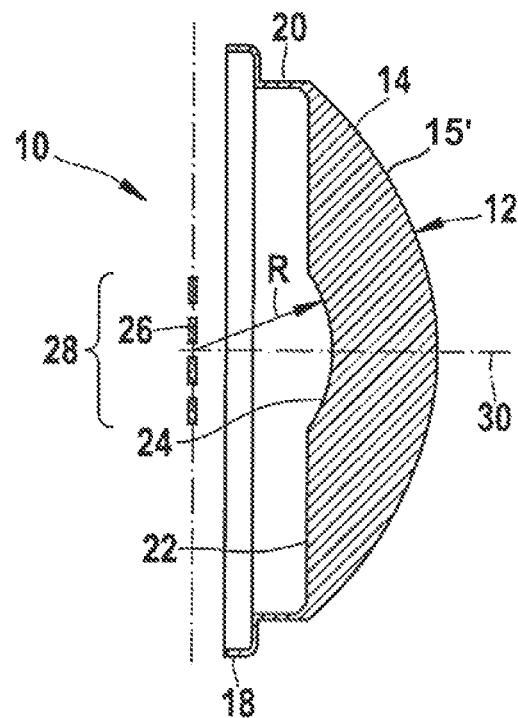
FIG. 3 shows a horizontal section through the lens according to FIG. 1.

FIG. 3 shows the cross section of concave cylindrical surface 24. The concavely curved surface in this example has the shape of a segment of a circle having radius R in a sectional view.

In this sectional diagram, convex surface 14 has an elliptical shape. FIG. 3 shows schematically four antenna patches 26, which together with a high-frequency electronic system (not shown) form a source 28 for radar radiation and at the same time function to receive the reflected radar signals. Antenna patches 26 are situated approximately at the center of the circle having radius R, which defines cylindrical surface 24 in the example shown here, but they are still offset in relation to one another in the horizontal direction and are situated symmetrically with optical axis 30 of lens 12. Thus, the four antenna patches 26 form four transmitting and receiving lobes offset from one another in azimuth. An evaluation of the signals received by the various patches therefore makes it possible to at least approximately determine the azimuth angle of the located objects.

The distance from lens 12 to the plane containing antenna patches 26 is selected in such a way that the combined effect of cylindrical surface 24 and convex surface 14 of the lens, which has only a weak curvature 15' in azimuth, results only in weak bundling of the radar radiation, so that the radiation from all four antenna patches is emitted in a relatively wide angle range on both sides of optical axis 30.

Figure 4:
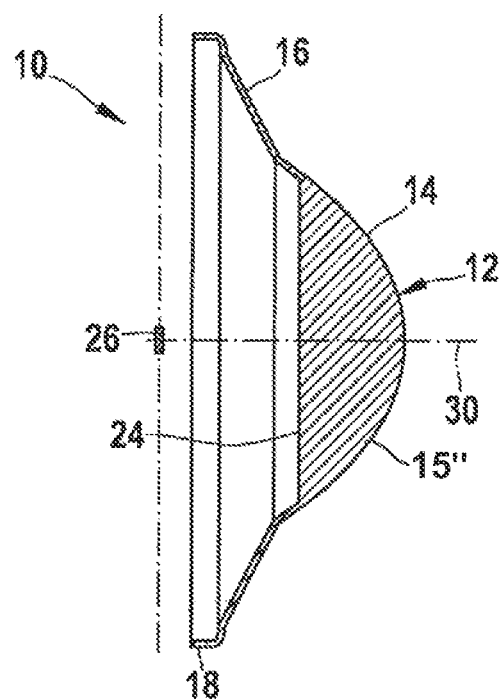
FIG. 4 shows a vertical section through the lens according to FIG. 1.

FIG. 4 shows a section through lens 12 in the vertical, i.e., in the plane of elevation, in which convex surface 14 also has an elliptical shape but has a much greater curvature 15". Cylindrical surface 24 appears to be flat in this direction. In elevation, lens 12 acts as an aplanatic lens, bundling the radiation emitted divergently from antenna patches 26 so that the beam bundle emitted is almost parallel.

Figure 5:
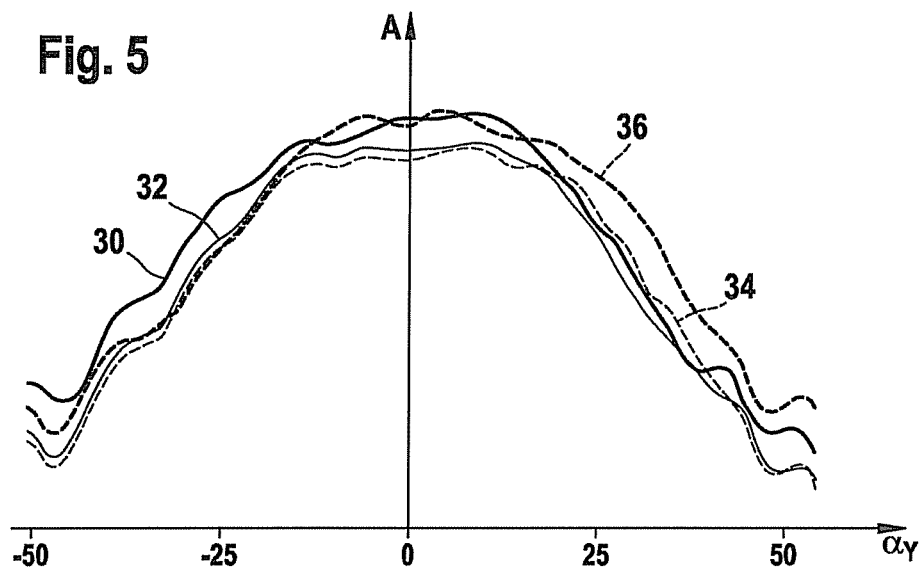
FIG. 5 shows an antenna azimuth diagram for a radar sensor having a lens according to FIGS. 1 through 4.
Figure 6:
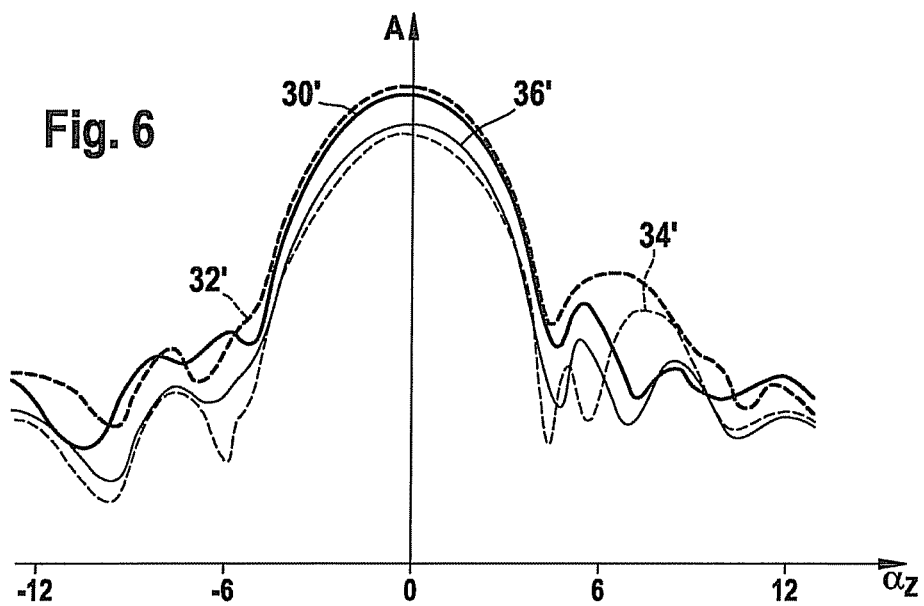
FIG. 6 shows an antenna elevation diagram of the radar sensor.

FIGS. 5 and 6 show the antenna diagrams in azimuth and in elevation, obtained from the lens geometry shown in FIGS. 1 through 4.

Curves 30, 32, 34 and 36 in FIG. 5 show amplitude A of the corresponding signal as a function of azimuth angle $\alpha_{65}$ for each antenna patch 26 at which the signal is emitted. It is seen here that each antenna patch forms a wide main lobe extending over an angle range of approximately ±50° and is accompanied by only very weakly manifested side lobes. The curves are offset somewhat relative to one another according to the offset of antenna patches 26 in azimuth, but they have a high overlap in the entire angle range, facilitating analysis of the signals and determination of the azimuth angle of the located objects.

Curves 30', 32', 34' and 36' in FIG. 6 indicate amplitudes A of the signals sent by the individual antenna patches 26 as a function of elevation angle $\alpha_Z$. This shows that the bundling effect of convex surface 14, which is highly curved in elevation, results in a narrow main lobe, extending over an angle range of only approximately ±6°. The main lobes are also accompanied by only relatively weak side lobes in elevation.

Since antenna patches 26 also function to receive the reflected radar signals, the antenna diagrams in FIGS. 5 and 6 may also be interpreted as diagrams of the sensitivity of the receiving antennas. The strong bundling in elevation (FIG. 6) ensures that interference signals such as ground clutter and the like will be effectively suppressed.

What is claimed is:

1. A radar sensor for a motor vehicle, comprising:
   a source for radar radiation; and
   a lens situated in front of the source and made of a material which is refractive for radar radiation, the lens having a convex surface on at least one side, the convex surface having a stronger curvature in an elevation plane than in an azimuthal plane substantially perpendicular to the elevation plane.

2. The radar sensor according to claim 1, wherein the convex surface of the lens is on a side facing away from the source, and the lens forms a concave cylindrical surface on a side facing the source.

3. The radar sensor according to claim 2, wherein concave cylindrical surface has the shape of a conical section in a sectional view.

4. The radar sensor according to claim 3, wherein concave cylindrical surface has the shape of a circular segment in a sectional view.

5. The radar sensor according to claim 2, wherein the concave cylindrical surface has a cylinder axis parallel to the elevation plane.

6. The radar sensor according to claim 2, further comprising a plurality of antenna patches positioned, in the elevation plane, at a center of a circle defining the concave cylindrical surface.

7. The radar sensor according to claim 6, wherein the antenna patches are positioned offset from one another in the azimuthal plane.

8. The radar sensor according to claim 6, wherein the radar sensor is configured to evaluate signals received by the antenna patches to determine an azimuth angle of located objects.

9. The radar sensor according to claim 1, wherein the convex surface of the lens has the shape of a conical section in a sectional view in the azimuthal plane and the elevation plane.

10. The radar sensor according to claim 9, wherein the convex surface has the shape of an elliptical segment in a section in the azimuthal plane and in the elevation plane.

11. The radar sensor according to claim 1, wherein the lens is configured as an aplanatic lens in elevation.

12. The radar sensor according to claim 1, wherein the azimuthal plane passes horizontally through an optical axis of the lens and the elevation plane passes vertically through the optical axis of the lens.

13. The radar sensor according to claim 1, wherein the convex surface has a maximum curvature in the elevation plane.

14. The radar sensor according to claim 1, wherein the lens has a smaller width in the elevation plane than in the azimuthal plane.

15. The radar sensor according to claim 1, wherein the lens has an elongated shape connected at longitudinal sides to surfaces of a cover cap into which the lens is integrated.

16. The radar sensor according to claim 1, wherein the convex surface of the lens is truncated at upper and lower ends where it connects to substantially planar end faces.

17. The radar sensor according to claim 1, wherein the lens is integrated into a cover cap for covering components of the radar sensor, the components including an antenna array and electronics of the radar source and a reception device for receiving reflected radar signals.

18. The radar sensor according to claim 1, wherein the lens suppresses radiation side lobes in the elevation plane to a greater extent than radiation side lobes in the azimuthal plane.

19. A radar sensor for a motor vehicle, comprising:
- a source for radar radiation; and
- a lens situated in front of the source and made of a material which is refractive for radar radiation;
- wherein the lens includes a convex surface on at least one side, and
- wherein a first curvature of a cross-section curve of the convex surface in an elevation plane is larger than a second curvature of a cross-section curve of the convex surface in an azimuthal plane substantially perpendicular to the elevation plane.

* * * * *